United States Patent [19]

Iwata et al.

[11] 4,065,776

[45] Dec. 27, 1977

[54] CAMERA WITH AUTOMATIC FLASH EXPOSURE SYSTEM

[75] Inventors: Hiroshi Iwata, Osaka; Katsuji Ishikawa, Daito, both of Japan

[73] Assignee: West Electric Co., Ltd., Osaka, Japan

[21] Appl. No.: 568,521

[22] Filed: Apr. 16, 1975

[30] Foreign Application Priority Data

Apr. 18, 1974 Japan .................................. 49-44102
Apr. 19, 1975 Japan .................................. 49-44995

[51] Int. Cl.$^2$ ............................ G03B 7/10; G03B 7/16
[52] U.S. Cl. ................................ 354/23 D; 354/27; 354/30; 354/34
[58] Field of Search ...................... 354/27, 29, 30, 32, 354/34, 139, 149, 23 D, 60 F

[56] References Cited

U.S. PATENT DOCUMENTS

| | | | |
|---|---|---|---|
| 3,750,543 | 8/1973 | Eloranta et al. | 354/27 |
| 3,886,568 | 5/1975 | Yazaki et al. | 354/27 |
| 3,900,855 | 8/1975 | Stempeck | 354/29 |
| 3,903,528 | 9/1975 | Kee | 354/29 |
| 3,945,025 | 3/1976 | Stempeck | 354/29 |

Primary Examiner—L. T. Hix
Assistant Examiner—M. L. Gellner
Attorney, Agent, or Firm—Burgess, Ryan and Wayne

[57] ABSTRACT

The invention discloses a camera with an automatic flash exposure system of the type in which depending upon the distance to a subject, the brightness thereof and the light flux to be produced by a flash tube or bulb, an f-number and exposure time are automatically and electrically selected by an exposure control mechanism comprising a plurality of shutter blades which also function as the aperture blades and a stepping motor for opening and closing stepwise the shutter blades. The focusing ring of the camera is operatively coupled to a variable resistor so that the distance to a subject may be converted into a resistance value, and the opening pulse signal consisting of one or a plurality of pulses the number of which is dependent upon this resistance value and hence the distance to the subject is applied to the step motor so that the shutter blades steps down the camera lens to a suitable f-number depending upon the distance to the subject. The exposure time is determined by an integrator including a photocell for detecting the brightness of the subject.

6 Claims, 8 Drawing Figures

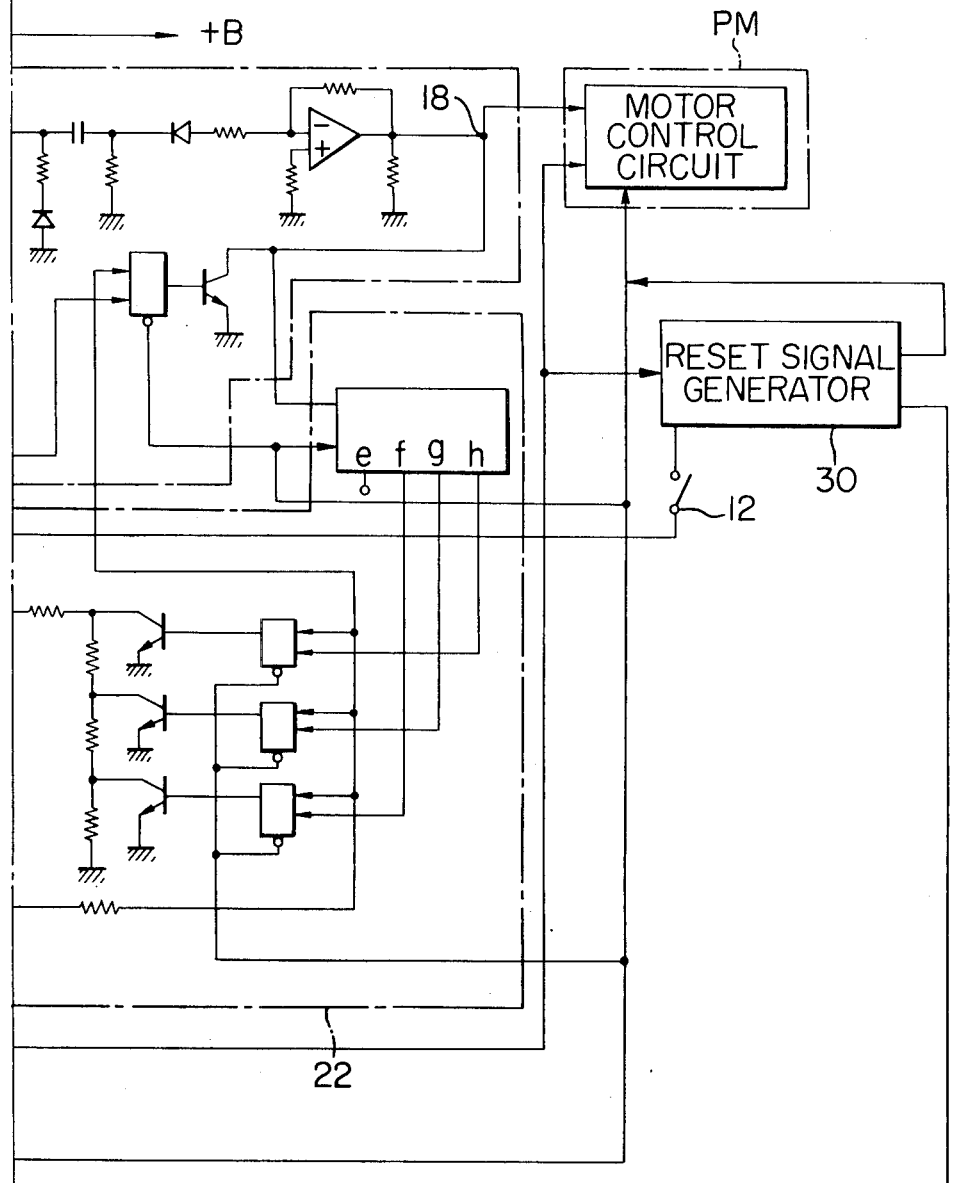

4,065,776

CAMERA WITH AUTOMATIC FLASH EXPOSURE SYSTEM

BACKGROUND OF THE INVENTION

The present invention relates to a camera with an automatic flash exposure system of the type in which an exposure control mechanism comprising a plurality of shutter blades which also function as the aperture blades and are operatively coupled to a stepping motor automatically adjusts, by discrete steps, the shutter blades, varying the lens $f$-number, in a manner functionally determined according as the object distance and the light flux produced by associated flash means such as a tube or bulb.

In order to eliminate the cumbersome cooperation of setting an aperture depending upon the distance to a subject and the light flux produced by a flash tube or bulb used in case of the flash exposure, there has been devised and successfully demonstrated as automatic flash exposure system in which an aperture is automatically set depending upon the distance to a subject by an aperture control or setting means operatively coupled to the focusing ring of the camera. Since the focusing ring and the aperture setting means are operatively interconnected by a complex mechanism such as a linkage or cam mechanism, the correct aperture cannot be set when the parts are worn out. Furthermore, the conventional automatic flash exposure system has a defect in that the aperture is set in a manner functionally only dependent upon the distance to a subject and the light flux produced by a flash tube or the like, without other exposure factors being taken into account. For instance, in case of the flash exposure of a subject illuminated by the natural light the aperture is determined only as a function of the distance to the subject and the light flux produced by the flash tube or bulb disregarding the brightness of the subject illuminated by the natural light so that the optimum exposure cannot be attained.

SUMMARY OF THE INVENTION

One of the objects of the present invention is, therefore, to provide a camera with an automatic flash exposure system with the least number of mechanical parts which are subjected to abrasion and wear, thus minimizing erratic aperture setting.

Another object of the present invention is to provide a camera with an automatic flash exposure system which ensures the optimum flash exposure of a subject illuminated by the natural light.

Another object of the present invention is to provide a camera with an automatic flash exposure system in which the area of the aperture is changed stepwise or discretely depending upon the distance to a subject.

Briefly stated, according to the present invention, the step motor in the program-controlled shutter is rotated stepwise in response to the number of the opening pulses applied thereto. Distance signal generating means such as a variable resistor in the control circuit is operatively coupled to the focusing ring of the camera so as to generate the electrical signal representative of the distance to a subject. In response to this electrical signal and to the light flux to be produced by a flash tube or bulb, the control circuit determines the number of opening pulses to be applied to the stepping motor so as to cause the shutter blades to stop down the camera lens to a suitable $f$-number. The above step is accomplished all electronically.

In order to attain the optimum flash exposure of a subject illuminated by the natural light, according to the present invention, means for detecting the brightness of a subject illuminated by the natural light is connected to a circuit for controlling the exposure time depending upon the brightness of the subject. Thus, the aperture and exposure time are selected depending upon not only the distance to a subject and the light flux produced by the flash tube or bulb but also depending upon the brightness of the subject illuminated by the natural light so that the optimum flash exposure may be attained.

BRIEF DESCRIPTION OF THE DRAWINGS

FIGS. 2, 2A and 2B are a diagram of an electronic control circuit suitable for providing control of the present invention.

DESCRIPTION OF THE PREFERRED EMBODIMENTS

Figure 1:
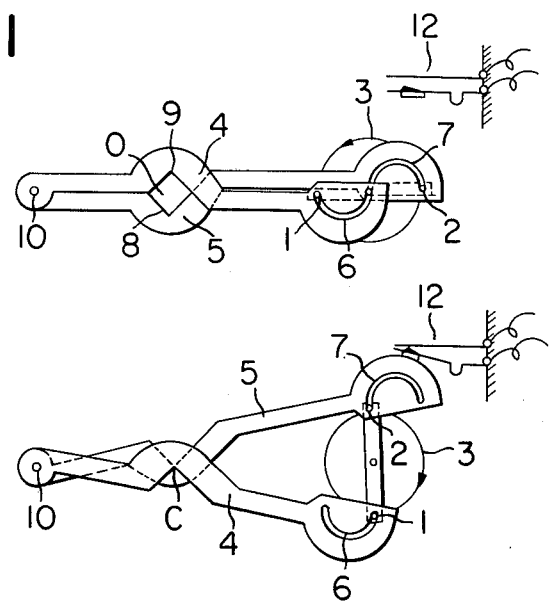
FIGS. 1A and 1B show an exposure control mechanism of a program-controlled shutter used in the present invention.

FIGS. 1A and 1B show an exposure control mechanism of a program-controlled shutter which is an improvement over that described in the above copending application.

Shutter blades 4 and 5, which also function as the aperture blades, have their one ends pivoted together with a pin 10 and have their other ends terminated into semi-circular portions provided with arcuate guide slots 6 and 7 into which are slidably fitted driving pins 1 and 2, respectively, of a stepping motor 3 of the conventional type. The shutter blades 4 and 5 are also provided with aperture defining portions 8 and 9 which cooperate to define an aperture. A switch 12 located above the ends of the shutter blades 4 and 5 is closed by the shutter blade 5 when the shutter blades 4 and 5 are closed as shown in FIG. 1B.

FIG. 1A shows that the shutter blades 4 and 5 are defining the maximum aperture 0. When the stepping motor 3 is rotated stepwise in the direction indicated by the arrow in FIG. 1A in response to the driving pulses, the driving pins 1 and 2 are moved aong the arcuate guide slots 6 and 7 of the shutter blades 4 and 5 so that the latter are closed as shown in FIG. 1B. The aperture is closed as indicated by C. On the other hand, when the stepping motor 3 is rotated stepwise in the direction indicated by the arrow in FIG. 1B, the shutter blades 4 and 5 are opened stepwise to define an aperture or stop down the camera lens.

As described above, when the shutter blades 4 and 5 are completely closed as shown in FIG. 1B, the switch 12 is closed by the shutter blade 5 to generate the control signal to be described in detail hereinafter.

In the instant embodiment, two shutter blades 4 and 5 are shown as being drivingly coupled to the stepping motor, but it is to be understood that three or five shutter blades are used and coupled to the stepping motor as with the case of the conventional rotary shutter. In this specification the exposure control mechanism comprising the shutter blades 4 and 5 and the stepping motor will be referred to as the "step shutter" hereinafter for the sake of brevity.

Figure 2A:
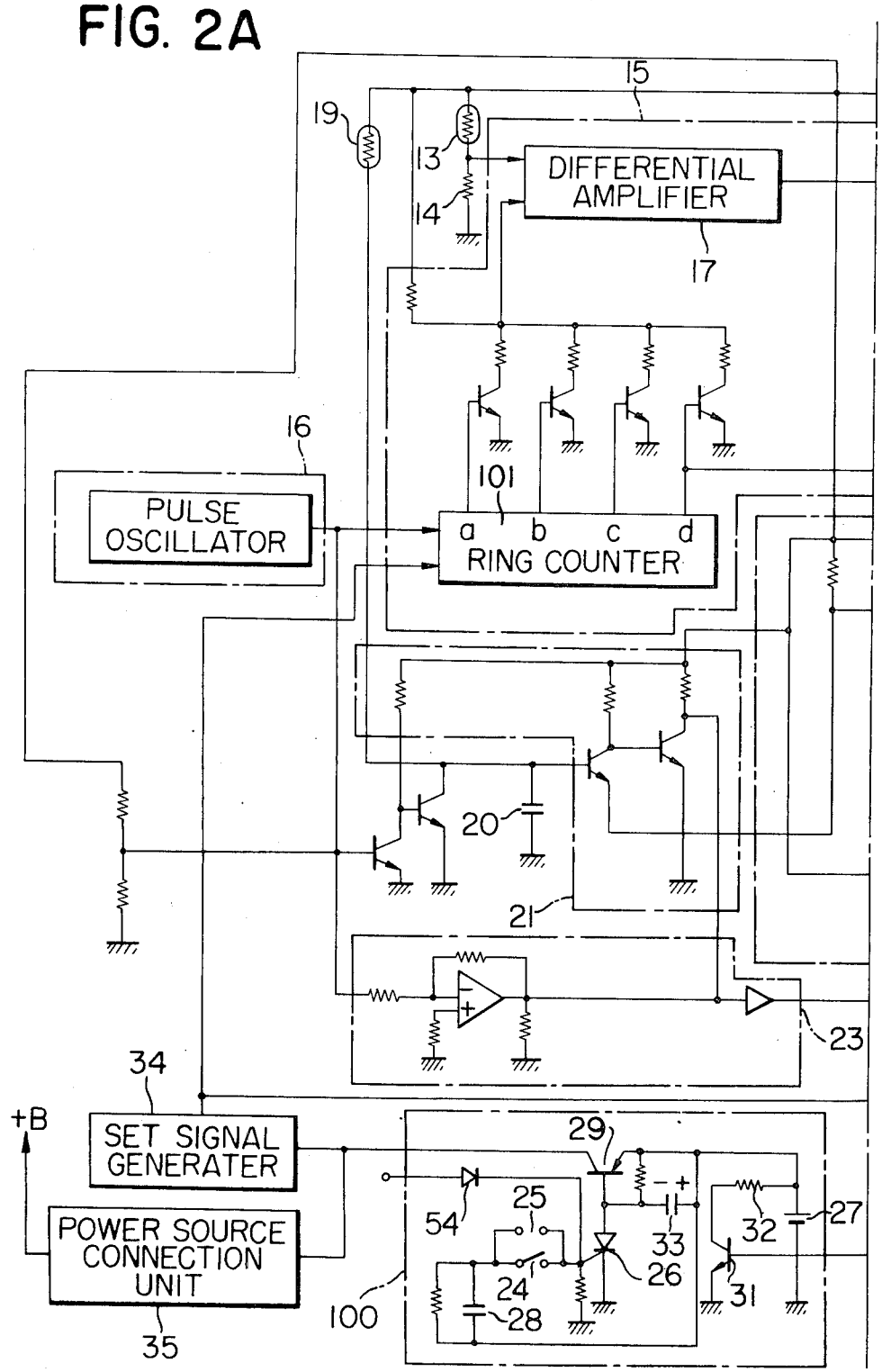
Figure 3:
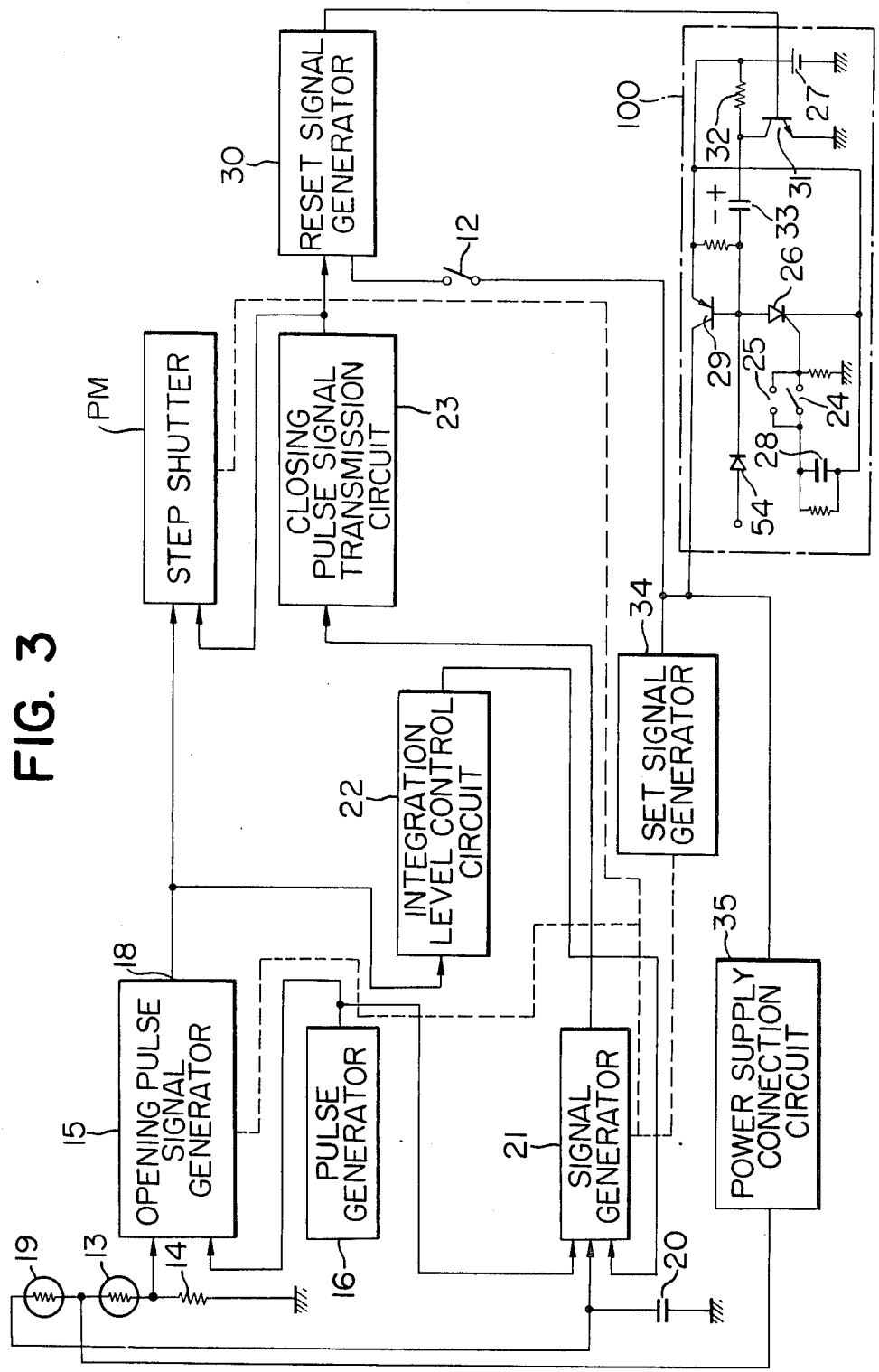
FIG. 3 is a block diagram of the circuit.

FIG. 2 is a diagram of an electronic control circuit for controlling the step shutter which circuit defines no part of the instant invention, and may be conveniently described in conjunction with a block diagram representation thereof, illustrated in FIG. 3. The control demonstrated in FIGS. 2 and 3 may be briefly described in functional terms with only brief focus on certain details of the circuit.

The first step of the operation of the control circuit is to determine an aperture to be defined by the shutter blades of the step shutter PM depending upon the brightness of a subject. The light from the subject is intercepted by a photocell 13 such as a CdS so that the voltage across a resistor 14 is in proportion to the brightness of the subject and is impressed to one input terminal of a differential amplifier 17 in an opening pulse signal generator 15. The pulses with a predetermined pulse spacing generated by a pulse generator 16 are applied to the other input terminal of the differential amplifier 17. Therefore the output pulse signals whose number is in proportion to the brightness of the subject may be derived from the output terminal 18 of the opening pulse signal generator 15 and are applied to the step shutter PM, so that the shutter blades may define the optimum aperture.

The second step is to determine the exposure time as a function of the aperture set depending upon the brightness of the subject. The light from the subject is also intercepted by a photocell such as a CdS element 19, and the current flowing through the photocell 19 is integrated by a capacitor 20. When the voltage across the capacitor 20 reaches a predetermined level, an signal generator 21 is actuated. The pulses from the pulse generator 16 are also applied to the signal generator 21, and the output from the opening pulse generator 15 is also applied thereto through an integration level control circuit 22. Therefore, a suitable time after the step shutter PM has been started to be opened, the closing pulse signal is transmitted thereto through a closing pulse signal transmission circuit 23 so that the step shutter PM is closed.

According to the present invention, in addition to the above described circuits, a control circuit generally indicated by reference numeral 100 are added to control them. When a switch 24, which is operatively coupled to a shutter button (not shown) of a camera, is closed, a capacitor 28 is discharged so that the current flows into the gate electrode of a silicon controlled rectifier 26 to conduct it. Then a transistor 29 is also conducted so that a battery or power supply means 27 is connected to the load which in turn is connected to the collector of the transistor 29, and the silicon controlled rectifier 26 is kept conducted, so that the connection of the power supply 27 to the load may be maintained.

As soon as the transistor 29 is conducted, a set signal generator 34 is actuated to generate the set signal in response to which the various circuits are set. A predetermined time after various circuits have been set in response to the set signal from the set signal generator 34, a power supply connection circuit 35 is energized to connect the power supply 27 to the various circuits. The above operation may be accomplished also in response to the control signal applied through a diode 54 or in response to the control signal applied to a terminal 25.

In summary, the control circuit shown in FIG. 2 determines the optimum exposure of a subject when the latter is not illuminated by the artificial light. FIG. 3 has been arranged in block diagram form to illustrate more simply the elements of FIG. 2.

FIRST EMBODIMENT, FIGS. 4 AND 5

Figure 4:
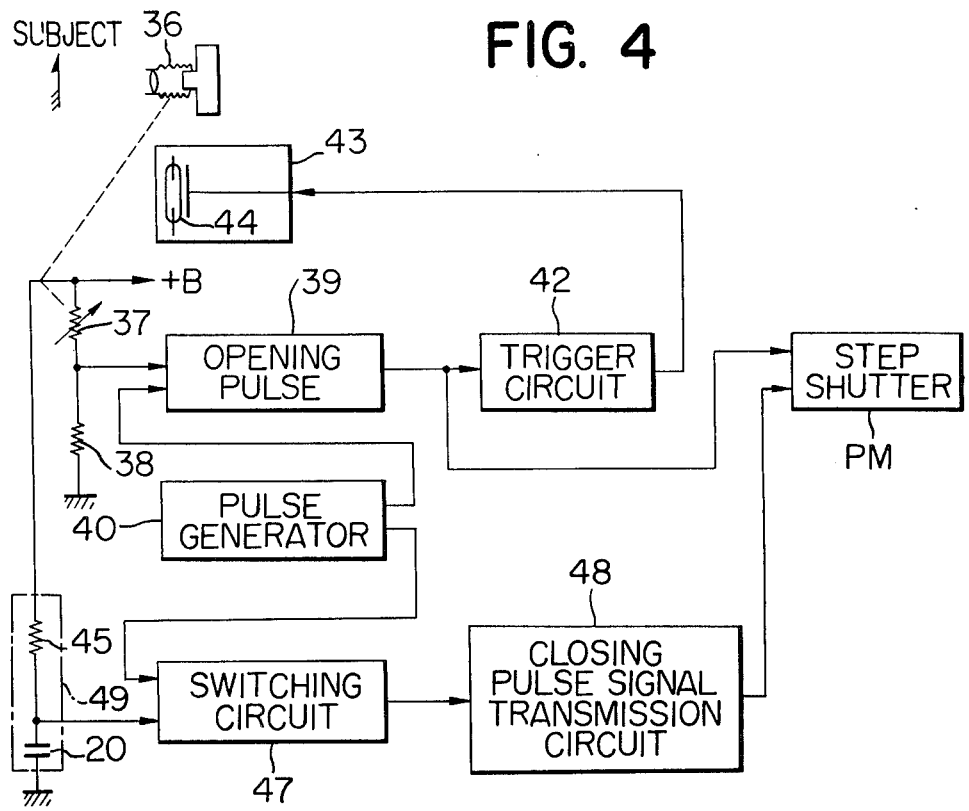
FIG. 4 is a block diagram of a first embodiment of the present invention.
Figure 5:
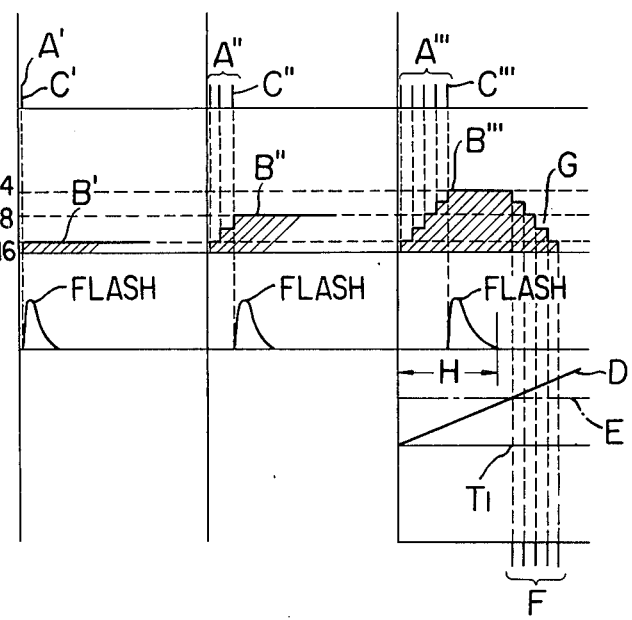
FIG. 5 is a view used for the explanation thereof.

FIG. 4 shows the block diagram of the first embodiment of a camera with an automatic flash exposure system in accordance with the present invention of the type in which the exposure by the step shutter is determined depending upon a distance to the subject. To this end, the present invention utilizes a program-controlled shutter of the type described in the copending patent application Ser. No. 519,653, and consisted of a plurality of shutter blades, a rotary motor for opening and closing the shutter blades so that the latter steps down the camera lens to a suitable f-number and opens the shutter opening for a suitable exposure time, and an electronic control circuit for controlling the operation of the step motor. The electronic control circuit is so arranged as to determine the f-number and exposure time not only depending upon the distance to a subject, which is converted into the suitable electrical signal by distance signal generating means operatively coupled to the focusing ring of the camera, but also depending upon the light flux produced by a flash tube or bulb. A focusing ring 36 of the camera is operatively coupled to a variable resistor 37, so that the value of the latter may represent the distance to the subject. The variable resistor 37 is connected in series to a fixed resistor 38, so that the voltage across the latter represents the distance to the subject and is applied to one input terminal of an opening pulse signal generator 39. The fixed voltage B+ represents the fixed light flux to be produced by the black lamp. The pulses with a predetermined pulse spacing (for instance, 2 miliseconds as shown at FIG. 5A) from a pulse generator 40 are applied to the other input terminal of the opening pulse signal generator 39. Therefore the opening pulse generator 39 generates the opening pulse signal corresponding to the distance to the subject. The opening pulse signal is applied to the step shutter PM.

The opening pulse signal generator 39 is substantially similar in construction to the generator 15 shown in FIGS. 2 and 3, and generates only one closing pulse signal as shown at A' in FIG. 5A when the distance to the subject is one meter, three pulse signals as shown at A" in FIG. 5A when the distance is two meters, five pulse signals as shown at A''' in FIG. 5A when the distance is 3 meters, and so on. Thus, in response to the number of the closing pulse signals applied to the step shutter PM, the latter causes its shutter blades to open to define a corresponding aperture in a manner described substantially similar to that described elsewhere.

In the instant embodiment, the shutter blades 4 and 5 (See FIGS. 1A and 1B) define an aperture corresponding to f-16, i.e., stops down the lens to f-16 in response to one pulse signal. In like manner, in response to three pulse signals, they define an aperture corresponding to f-8, and in response to five pulse signals, they define an aperture corresponding to f-4. Therefore the step shutter PM sets a shutter opening as indicated at B', B" or B''' in FIG. 5B depending upon the distance to the subject.

A trigger circuit 42 is actuated in response to the last pulses C', C" or C''', as shown in FIG. 5A, of the closing pulse signal to generate the trigger pulse. There are various means for actuating the trigger circuit in response to the last pulse C', C" or C'", but the last pulse may be detected in a simple means if the photocell 13 shown in FIG. 2 is replaced by the variable resistor 37 and the opening pulse generator 39 is replaced by the pulse signal generator 15.

If the opening pulse generator 39 of FIG. 4 utilizes the opening pulse signal generator 15, the differential amplifier 17 compares the voltage across the variable resistor 37 representative of the distance to the subject with the stepping voltage obtained by converting the pulses from the pulse generator 16 by the Johnson circuit 101 and its load transistor, and generates the stepping output voltage which represents the distance to the subject. The DC level of the differential amplifier 17 output depends both on the voltage across resistor 14 and the number of step pulses from Johnson circuit 101. Of the output voltage, the voltage higher than a predetermined level is converted by trigger 42 into the pulse signal. Therefore, the distance to the subject may be detected by detecting this level.

The trigger circuit 42 generates the high voltage trigger pulse which is applied to the trigger electrode of a flash tube 44 in a flash device 43, so that the flash is produced as shown in FIG. 5C. The flash device 43 is of the conventional type such as an electronic flash or strobe in which a flash tube is triggered and flashed by the discharge of a capacitor.

In FIG. 4, the trigger circuit 42 is shown by a block, and it has been so far impossible to connect the trigger circuit 42 to the xenon-gas-filled flash tube in the flash device by a long lead wire because the high voltage of the order of hundreds bolts must be impressed across the flash tube. In the conventional flash device, a pulse transformer is located adjacent to the flash tube so that its secondary may be connected to the flash tube by the shortest wire. The primary of the pulse transformer is connected to a trigger capacitor to make up a resonant circuit, and the trigger capacitor is discharged through control means such as a silicon controlled rectifier to trigger the flash tube.

Therefore, according to the present invention, the resonant circuit as well as the silicon controlled rectifier are housed within the flash device 43, and the trigger pulse from the opening pulse signal generator 39 is transmitted through a lead wire to the gate of the silicon controlled rectifier.

It is, of course, possible to house the flash device 43 within the casing of the camera, and to use a flash bulb instead of the flash tube.

Next, the closing of the step shutter PM will be described. As soon as the opening pulse signal generator 39 has been actuated, an integrator 49 consisting of a resistor 45 and a capacitor 20 is actuated, so that the voltage across the capacitor 20 increases as shown at D in FIG. 5D depending upon the time constant which is determined by the values of the capacitor and the resistor. When the voltage across the capacitor 20 reaches the operating level E of a switching circuit 47 at the time T, the switching circuit 47 is actuated to permit the transmission of the pulses from a pulse generator 40 to a closing signal transmission circuit 48 where the pulses are converted into the negative going closing pulse signals as shown at F in FIG. 5E.

The closing pulse signals F are applied to the step shutter PM, so that the shutter opening is closed as indicated at G in FIG. 5B.

The switching circuit 47 and the closing pulse signal transmission circuit 48 are substantially similar in construction to the integrated signal generator 21 and the closing signal transmission circuit 23, respectively, shown in FIG. 2. The generator 21 and the circuit 23 are described in detail in the above copending application so that no description shall be made in this specification.

The time constant of the integrator 49 is selected to be larger than time interval H; that is the time required for applying five opening pulses (See FIG. 5A, A'") to the step shutter PM plus the flash time of the flash tube 44. The reason is that if the voltage D across the capacitor 20 should reaches the operating level of the switching circuit 47 within the time interval H, the step shutter PM would start to close, so that the shutter opening would be completely closed even when the flash is still continued.

In the instant embodiment, the step shutter PM has been described as stopping down the camera lens to $f$-16, $f$-8 or $f$-4, but it is to be understood that the step shutter may be so arranged as to stop down the camera lens to any suitable $f$-numbers in addition to $f$-16, $f$-8 and $f$-4.

SECOND EMBODIMENT, FIGS. 6 AND 7

Figure 6:
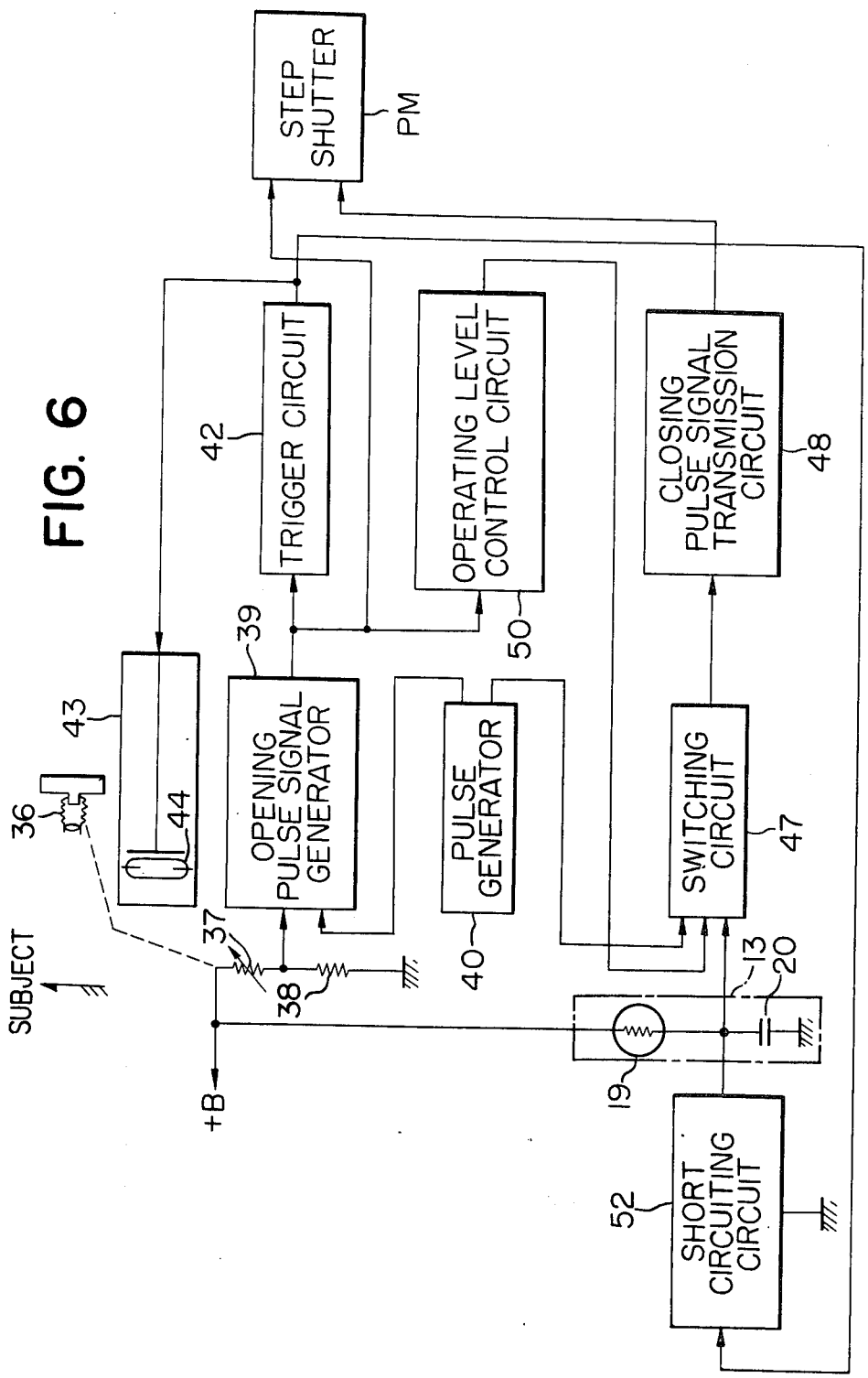
FIG. 6 is a block diagram of a second embodiment of the present invention.

The second embodiment of the present invention shown in block diagram in FIG. 6 is adapted to make the flash exposure of a subject which is also illuminated by the natural light. As with the first embodiment described above, the aperture is determined depending upon the distance to the subject, but since the subject is illuminated by the natural light, an additional integrator consisting of a photocell such as a CdS element and a resistor is provided in order to control the exposure time depending upon the brightness of the subject.

In general, the exposure value is given by the following expression in APEX system:

$$EV = Av + Tv$$

where $EV$ = exposure value,
$Av$ = aperture index, and
$Tv$ = exposure time index.
Therefore, for the same $EV$, $Tv$ must be varied as a function of $Av$. The exposure time control in the present invention is based upon the above principle. That is, depending upon the aperture which is dependent upon the distance to a subject and upon the brightness of the subject illuminated by the natural light, the timing for closing the step shutter PM is determined; that is, the time when the switching circuit 47 is turned on is determined by an operating level control circuit 50 which determines the operating level of the switching circuit 47.

As soon as the trigger circuit 42 is actuated, a short-circuiting circuit 52 which has been short-circuiting the capacitor 20 in the integrator 53 is opened, so that the voltage representative of the brightness of the subject illuminated by the natural light and detected of the photocell 19 is charged across the capacitor 20 as shown in FIG. 7D. When the voltage across the capacitor 20 reaches an operating level predetermined by the operating level control circuit 50, the step shutter PM starts to close in a manner substantially similar to that of the first embodiment.

The step shutter PM stops down the camera lens to the optimum $f$-number depending upon the distance to the subject in a manner substantially similar to that of the first embodiment.

Figure 7:
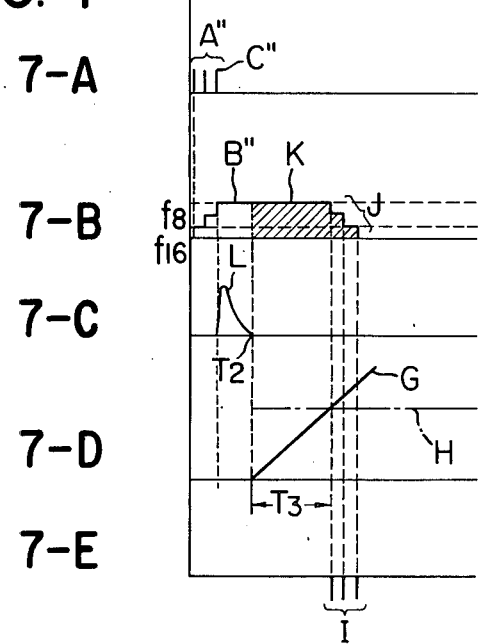
FIG. 7 is a view used for the explanation thereof.

The mode of operation of the second embodiment will be described in more detail with particular reference to FIG. 7. It is assumed that the distance to a subject is 2 meters. Then, as described elsewhere, the opening signal A" consisting of three pulses is generated as shown in FIG. 7A, so that the step shutter PM opens its shutter opening stepwise as shown at B" in FIG. 7B. In response to the last pulse C" of the opening signal A" the trigger circuit 42 generates the trigger pulse so that the flash tube 44 emits the light flash L as shown in FIG. 7C. When the flashing is completed at time $T_2$, the short circuiting circuit 52 including a delay circuit (not shown) is opened so that the voltage across the capacitor 20 in the integrator 53 rises as shown at G in FIG. 7D. When the voltage across the capacitor 20 reaches the operating level H which is determined by the operating level control circuit 50, the switching circuit 47 is actuated, so that the closing pulses shown at I in FIG. 7E are applied to the step shutter PM. As a result, the step shutter PM closes the shutter opening stepwise as indicated at J in FIG. 7B in a manner substantially similar to that of the first embodiment. Therefore, the exposure time depending upon the brightness of the subject illuminated by the natural light is $T_3$; that is, a time interval from the time when the charging of the capacitor 20 in the integrator 53 is started to the time when the closing signal I is generated.

The operating level or integration level control circuit 50 is substantially similar in construction to the integration level control circuit 22 shown in FIG. 2. The output of the integration level control circuit 22 changes depending upon the number of opening pulses to be applied to the step shutter PM so as to control the actuating timing of the integrated signal generator 21 corresponding to the switching circuit 47 in FIG. 6.

The short-circuiting circuit 52 may be of any conventional type which is turned on and off in response to the signal from the trigger circuit 42.

What is claimed is:

1. In a camera with an automatic flash exposure system, a combination comprising
    a. an exposure control mechanism comprising
        a plurality of shutter blades which also function as the aperture blades, and
        driving means which rotates stepwise in response to driving pulses for opening and closing stepwise said shutter blades;
    b. opening pulse generating means for generating and applying to said driving means the opening pulse signal consisting of one or plurality of pulses the number of which is dependent upon the signal representative of the distance to a subject generated by converting means operatively coupled to focusing means of the camera and upon the light flux to be produced by flash means so that said driving means causes said shutter blades to open so as to stop down the camera lens to the optimum f-number depending upon said distance and said light flux;
    c. trigger means actuable in response to the last pulse of said opening pulse signal to generate the trigger signal for energizing said flash means; and
    d. closing pulse signal generating means for generating and applying to said driving means the closing pulse signal consisting of one or a plurality of pulses equal in number to the pulse or pulses of said opening pulse signal a predetermined time after said shutter blades have been started to be opened, thereby causing said shutter blades to close, whereby said shutter blades may stop down the camera lens to an f-number depending upon the distance to the subject and the light flux to be produced by said flash means.

2. A combination as set forth in claim 1 wherein said closing pulse signal generating means comprises means for generating the closing pulse signal a predetermined exposure time following the last of said pulses of said opening pulse signal, which is dependent upon the brightness of a subject and for applying said closing pulse signal to said driving means,
    whereby said shutter blades may step down the camera lens to an f-number depending upon the distance to the subject and the brightness thereof and may open the shutter opening for a predetermined time depending upon the distance to the subject and the brightness thereof.

3. A combination as set forth in claim 2 wherein said closing pulse signal generating means is controlled by a short-circuiting circuit which is opened to energize said closing pulse signal generating means immediately after the completion of the flashing by said flash means.

4. A combination as set forth in claim 2 wherein said closing pulse signal generating means comprising
    a. an integrator comprising a photocell and a capacitor;
    b. a short-circuiting circuit which normally short-circuits said capacitor; control circuit means providing a signal level corresponding to the number of opening pulses;
    c. a switching circuit controlled by a control signal and by a signal from said integrator;
    d. a pulse generator for generating pulses with a predetermined pulse spacing; and
    e. a closing pulse signal transmission circuit for permitting the transmission of the closing pulse signal when said switching circuit is energized, said short-circuiting circuit being opened in synchronism with the flashing by said flash means so as to actuate said integrator in such a way that when the voltage across said capacitor of said integrator reaches a predetermined level which is determined by said control circuit means said switching circuit is energized to transmit through said closing pulse signal transmission circuit said pulses from said pulse generator as said closing pulse signal after a predetermined exposure time depending upon the brightness of the subject.

5. A combination as set forth in claim 1 wherein said closing pulse signal generating means comprises
    a. an integrator comprising a resistor and a capacitor,
    b. a switching circuit which reverses its state when the voltage across said capacitor reaches a predetermined level, and
    c. a closing pulse signal transmission circuit for permitting the transmission of the closing pulse signal therethrough to said driving means when said switching circuit reverses its state.

6. A combination as set forth in claim 5 wherein the time required for the voltage across the capacitor in said integrator to reach a predetermined level is selected longer than the time required for transmitting said opening pulse signal to said driving means plus the flashing time of said flash means.

* * * * *

UNITED STATES PATENT OFFICE
CERTIFICATE OF CORRECTION

Patent No. 4,065,776         Dated December 27, 1977

Inventor(s) Hiroshi Iwata, et al

It is certified that error appears in the above-identified patent and that said Letters Patent are hereby corrected as shown below:

Column 1, line 20: "as" should be --an--.

Column 2, lines 32-33: "in the above copending application" should be --in the copending application mentioned below--.

line 50: "aong" should be --along--.

Column 3, line 34: "an" should be --a--.

line 47: "are added" should be --is added--.

Column 4, line 15: "and consisted of" should be --which consists of--.

UNITED STATES PATENT OFFICE
CERTIFICATE OF CORRECTION

Patent No. 4,065,776     Dated December 27, 1977

Inventor(s) Hiroshi Iwata, et al

It is certified that error appears in the above-identified patent and that said Letters Patent are hereby corrected as shown below:

Column 4, line 37: "miliseconds" should be --milliseconds--.

Column 5, line 33: "bolts" should be --volts--.

Column 6, line 14: "should reaches" should be --should reach--.

Column 8, line 27: "comprising" should be --comprises--.

Signed and Sealed this

Twenty-first Day of November 1978

[SEAL]

Attest:

RUTH C. MASON
Attesting Officer

DONALD W. BANNER
Commissioner of Patents and Trademarks